United States Patent [19]

Kim

[11] Patent Number: 5,234,244
[45] Date of Patent: Aug. 10, 1993

[54] BI-DIRECTIONAL FEEDING GRIPPER DEVICE

[75] Inventor: Mun S. Kim, Seoul, Rep. of Korea

[73] Assignee: Korea Institute of Science and Technology (KIST), Seoul, Rep. of Korea

[21] Appl. No.: 842,506

[22] Filed: Feb. 27, 1992

[30] Foreign Application Priority Data

Mar. 16, 1991 [KR] Rep. of Korea ............... 4206/1991

[51] Int. Cl.$^5$ ................. B66C 1/28; B25J 15/08
[52] U.S. Cl. ........................ 294/88; 294/115
[58] Field of Search .......... 294/88, 115, 116, 2; 901/37

[56] References Cited

U.S. PATENT DOCUMENTS

| 2,016,683 | 10/1935 | Moore | 294/115 X |
| 3,463,226 | 8/1969 | Johnson | 901/37 X |
| 4,348,044 | 9/1982 | Wood, III | 294/88 |
| 4,569,549 | 2/1986 | Nakashima et al. | 294/88 |
| 4,729,588 | 3/1988 | Kratzer | 294/88 |
| 5,040,836 | 8/1991 | Roudaut | 294/88 |

FOREIGN PATENT DOCUMENTS

| 285193 | 11/1971 | U.S.S.R. | 294/88 |
| 870111 | 10/1981 | U.S.S.R. | 294/88 |

Primary Examiner—David M. Mitchell
Assistant Examiner—Dean J. Kramer
Attorney, Agent, or Firm—Oliff & Berridge

[57] ABSTRACT

A bi-directional feeding gripper device including a single cylinder and upper and lower cylindrical cap members mounted to upper and lower ends of the cylinder and provided with pneumatic pressure passages communicated with the interior of the cylinder, respectively. An upper lifting piston having a driving rod and a lower gripping piston spaced from the lifting piston are disposed in the cylinder. A compression coil spring is disposed around the driving rod between the lifting piston and the gripping piston. The driving rod extends through the gripping piston such that its lower end is protruded beyond the lower end of the lower cap member. The gripper device also includes a gripper fixed to the lower end of the gripping piston to move vertically together with the gripping piston and provided with a pair of fingers each having one end pivotally mounted to the gripper and the other end pivotally mounted to the protruded lower end of the driving rod. With this construction, the gripper device can perform a bi-directional movement including upward and downward movements of the gripper and opening and closing movement of fingers, by means of the single cylinder, thereby enabling the overall construction to be simplified and the overall cycle time to be reduced.

3 Claims, 6 Drawing Sheets

BI-DIRECTIONAL FEEDING GRIPPER DEVICE

BACKGROUND OF THE INVENTION

1. Field of the Invention

The present invention relates to a device for driving a robot hand, which is adapted to automatically feed and supply objects via a robot or a pneumatic feeding device used in industrial automation equipment or semi-automation equipment. In particular, the present invention relates to a bi-directional feeding gripper device which is capable of performing a bi-directional movement including a vertical movement and a picking, by the operation of a single cylinder.

2. Description of the Prior Art

Generally, industrial automation equipment or semi-automation equipment include a robot adapted to feed, supply or insert continuously or repeatedly objects by using a pneumatic device. The pneumatic device involves basic operations including a movement that the pneumatic device reaches the position of the object and a movement for picking the object. Otherwise, the pneumatic device may involve a combination of two separated stepwise operations including a feeding operation wherein a gripped object is moved to a predetermined position and a placing operation wherein the object is placed on the predetermined position.

A typical example of such a conventional pneumatic device is a chucking gripper equipped with a feeding cylinder. The construction is illustrated in FIG. 1. As shown in the drawing, the pneumatic device includes a lifting cylinder 31 in which a piston is disposed, a chucking cylinder 33 coupled to the lower end of a driving rod 32 protruded downwardly through the lifting cylinder 31, and a chucking gripper 35 mounted to the chucking cylinder 33 and provided at its lower end with fingers 34.

As the lifting cylinder 31 drives, the chucking gripper 35 moves downwardly or upwardly. Irrespective of the driving of lifting cylinder 31, the fingers 34 of the chucking gripper 35 are driven by the chucking cylinder 33, so as to carry out operations of gripping or placing an object.

For accomplishing such separated two stepwise operations, this conventional pneumatic device requires two cylinders, as above-mentioned. It is also required to provide additional elements such as solenoids for driving the cylinders. As a result, the overall construction of the pneumatic device is complicated. Furthermore, there is a disadvantage of the delay in the operation time and the reduction in the accuracy of work, due to the two stepwise operations.

SUMMARY OF THE INVENTION

Therefore, an object of the invention is to eliminate the above-mentioned disadvantages encountered in the prior art and to provide a bi-directional feeding gripper device which is capable of performing continuously and repeatedly both upward and downward movements of a gripper and finger opening and closing movements, by a single linear movement of a piston and a driving rod carried out through a single cylinder.

In accordance with the present invention, this object can be accomplished by providing a bi-directional feeding gripper device including a cylinder, upper and lower cylindrical cap members mounted to upper and lower ends of the cylinder and provided with pneumatic pressure passages communicated with the interior of the cylinder, respectively, an upper lifting piston disposed in the cylinder and having a driving rod mounted to the lower end thereof, a lower gripping piston disposed in the cylinder below the lifting piston to define a predetermined space from the lower end of the lifting piston, the gripping piston having a rod extending downwardly through the lower cap member such that its lower end is protruded beyond the lower end of the lower cap member and a rod receiving hole through which the driving rod of the lifting piston extends downwardly such that its lower end is protruded beyond the lower end of the rod of the gripping piston, a compression coil spring disposed around the driving rod in the predetermined space and adapted to urge the lifting piston and the gripping piston away from each other, and a gripper fixed to the lower end of the gripping piston and provided with a pair of fingers each having one end pivotally mounted to the gripper and the other end pivotally mounted to the protruded lower end of the driving rod, so that fingers move between an opening position and a gripping position, upon a vertical reciprocating movement of the lifting piston.

BRIEF DESCRIPTION OF THE DRAWINGS

Other objects and aspects of the invention will become apparent from the following description of embodiments with reference to the accompanying drawings in which:

FIGS. 4A and 4B are sectional views similar to FIG. 2, wherein FIG. 4A shows the condition that the gripper device is at a lower position where it reaches an object, while FIG. 4B shows the condition that fingers of the gripper device are at their opening positions.

DESCRIPTION OF THE PREFERRED EMBODIMENTS

Figure 1:
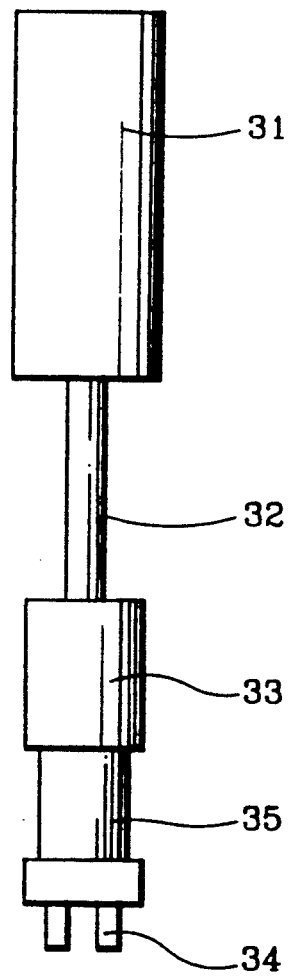
FIG. 1 is an elevation view schematically illustrating a conventional gripper device.
Figure 2:
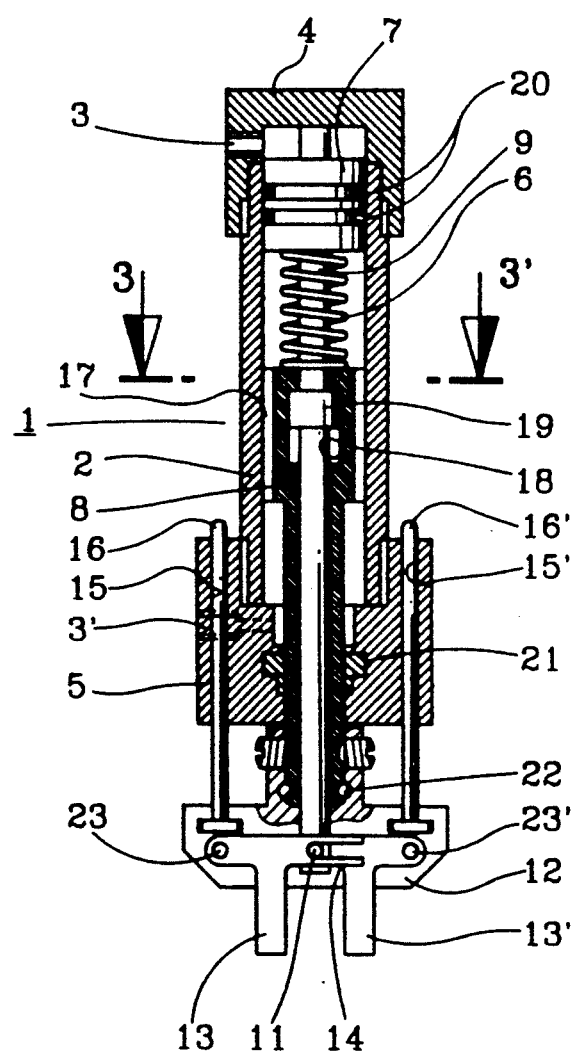
FIG. 2 is a sectional view of a bi-directional feeding gripper device in accordance with an embodiment of the present invention.

Referring to FIG. 2, there is shown a bi-directional feeding gripper device in accordance with an embodiment of the present invention. As shown in FIG. 2, the bi-directional feeding gripper device 1 includes a cylinder 2 driven by a pneumatic pressure, and upper and lower cylindrical cap members 4 and 5 mounted to upper and lower ends of the cylinder and provided with pneumatic pressure passages 3 and 3' communicated with the interior of the cylinder 2, respectively. Within the cylinder 2, an upper lifting piston 7 and a lower gripping piston 8 are disposed. The piston 7 has a driving rod 9 mounted on the lower end thereof. Between the lower end of the lifting piston 7 and the upper end of the gripping piston 8, a compression coil spring 6 is disposed around the driving rod 9. The spring 6 functions to urge the lifting piston 7 and the gripping piston 8 away from each other. The driving rod 9 extends through a rod receiving hole 10 formed vertically throughout the center portion of the piston 8 such that its lower end protrudes beyond the lower end of the lower cap member 5. The gripper device 1 also includes a gripper 12 fixed to the lower end of the gripping piston 8 to move vertically together with the gripping piston 8 and provided with a pair of fingers 13 and 13' each pivotally mounted at its one end thereto. The fingers 13 and 13' have recesses 14 and 14' at their other ends, respectively. Into the recesses 14 and 14', an engaging protrusion 11 extending from the protruding lower end of the driving rod 9 is commonly inserted.

In order to prevent any rotation and swing of the gripper 12 when the gripper 12 is vertically moved, together with the gripping piston 8, a pair of guide rods 16 and 16' extending upwardly are mounted to the gripper 12 such that they are inserted into vertical guide holes 15 and 15' formed in the gripping piston 8 to move upwardly and downwardly therein.

Figure 3:
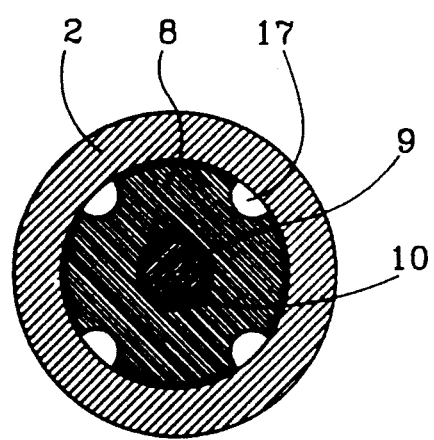
FIG. 3 is a cross-sectional view taken along the line A—A of FIG. 2.

The gripping piston 8 has a cross-section having a plurality of uniformly spaced semi-circular vertical grooves 17 formed at the periphery thereof, as shown in FIG. 3. By virtue of the vertical grooves 17, an air communication between the space above the gripping piston 8 and the space below the gripping piston 8 in the interior of the cylinder 2 can be obtained. The gripping piston 8 has at its upper end an enlarged central space 18 having a diameter larger than that of the rod receiving hole 10. In the enlarged central space 18, a larger diameter portion 19 of the driving rod 9 is received.

In the drawings, the reference numeral 20 designates a piston seal, 21 a guide boss, 22 a spring ring, and 23 and 23' pivot pins.

Now, upward and downward movements of the gripper and opening and closing movements of the fingers will be described, in conjunction with FIG. 4.

FIG. 2 shows the condition that the lifting piston 7 and the gripper 12 are positioned at their uppermost positions, respectively. As a pneumatic pressure is applied to the interior of the cylinder 2, via the pneumatic pressure passage 3 formed at the upper cap member 4, at the above-mentioned condition, the lifting piston 7 and the gripping piston 8 are downwardly moved, together with the driving rod 9. By the downward movement of the driving rod 9, the gripper 12 fixed to the lower end of the gripping piston 8 is downwardly moved. At this time, the downward movement of the gripper 12 is guided by guide rods 16 and 16'. During the downward movement, the space between the lifting piston 7 and the gripping piston 8 is uniformly maintained by virtue of the resilient force of the spring 6 disposed between the lifting piston 7 and the gripping piston 8.

Figure 4A:
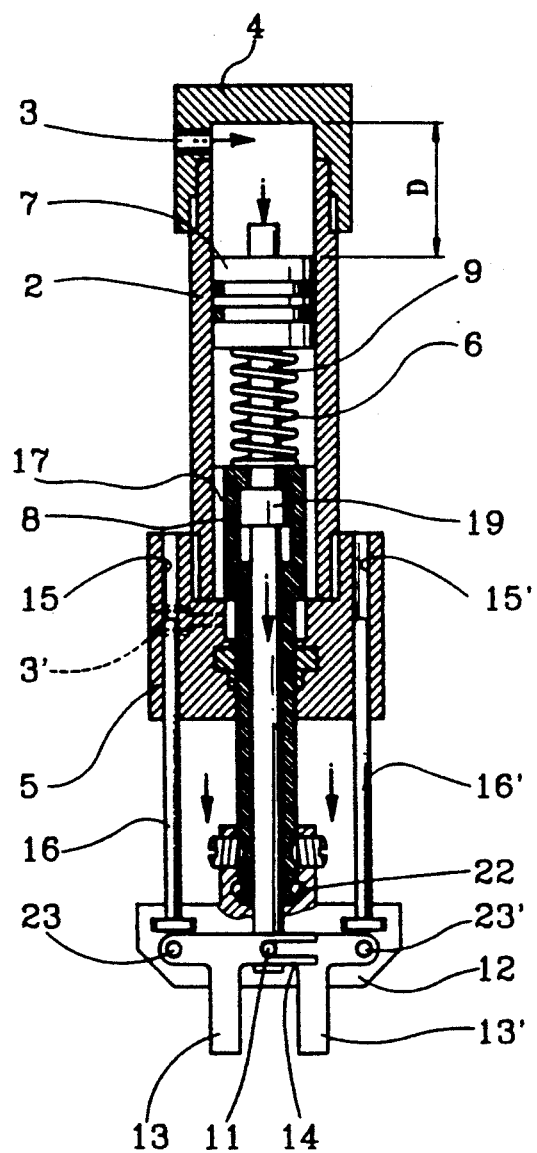
Figure 4B:
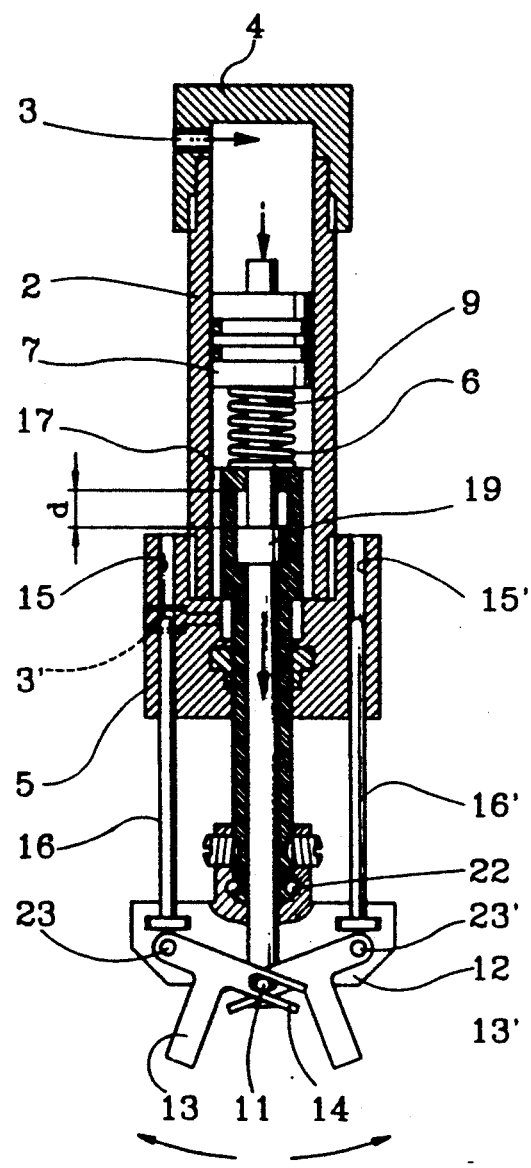

The downward movement of the gripping piston 8 is continued until the lower end of the gripping piston 8 contacts the inward lower end of the cylinder 2, as shown in FIG. 4A. As the downward movement of the gripping piston 8 is stopped, the downward movement of the gripper 12 is also stopped. At this time, the lifting piston 7 is maintained at the position shifted the distance D shown in FIG. 4A from the position shown in FIG. 2.

Until the gripper device 1 reaches the state shown in FIG. 4A, fingers 13 and 13' are still maintained at their initial states, since the space defined between the lifting piston 7 and the gripping piston 8 is still maintained without any reduction, by virtue of the resilience of the spring 6. That is, there is no relative movement of the driving rod 9 to the gripping piston 8. However, as the downward moving force applied continuously to the lifting piston 7 by the pneumatic pressure exceeds the resilience of the spring 6, the compression of the spring 6 occurs, thereby causing the driving rod 9 to be downwardly moved in the rod receiving hole 10.

By the downward movement of the driving rod 9, fingers 13 and 13' which are connected to the engaging protruding 11 formed at the lower end of the driving rod 9 pivot outwardly about pivot pins 23 and 23', respectively, in a direction of widening the space defined therebetween.

The downward movement of the driving rod 9 is stopped when the lower end of the larger diameter portion 19 contacts the lower end of the enlarged space 18. As a result, the distance that the larger diameter portion 19 moves in the enlarged space 18 corresponds to the widening degree d of the fingers 13 and 13'.

According to the above-mentioned procedure, the downward movement of the gripper and the opening movement of fingers are accomplished. When a pneumatic pressure is applied to the interior of the cylinder 2 via the pneumatic pressure passage 3' formed at the lower cap member 5 at the state shown in FIG. 4B, in a reversed manner, according to the operation of a solenoid, it flows into the space defined between the lifting piston 7 and the gripping piston 8, via vertical grooves 17 formed at the periphery of the gripping piston 8 and acts on the lower end of the lifting piston 7, so that the piston 7 returns to its original position relative to the piston 8. At this time, the spring 6 also returns to its original state. By the upward movement of the lifting piston 7 relative to the gripping piston 8, the driving rod is lifted, thereby causing fingers 13 and 13' to return to their original gripping positions shown in FIG. 4A.

As the pneumatic pressure is continuously applied via the pneumatic pressure passage 3' of the lower cap member 5, at the state shown in FIG. 4A, the gripper device 1 returns to its original state shown in FIG. 2. Thus, one operation cycle of the gripper device 1 is accomplished.

The gripper device of the present invention can be independently used by itself. However, it is preferred to use a plurality of gripper devices mounted to the periphery of a polyhedron mounting bracket, together with typical unidirectional grippers, in combination, as shown in FIG. 5.

Figure 5:
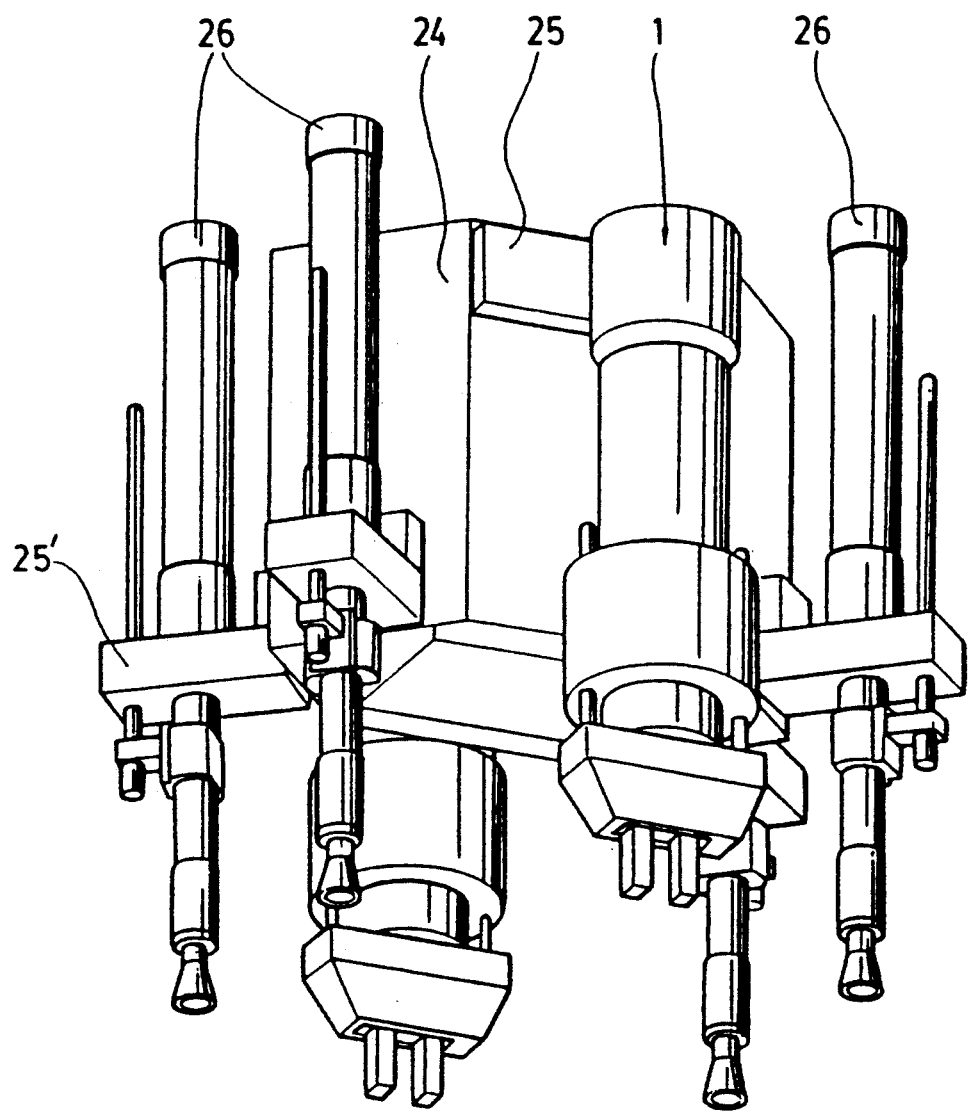
FIG. 5 is a perspective view of a multi-gripper system including a plurality of gripper devices according to the present invention.

Referring to FIG. 5, there is illustrated a case wherein two bi-directional feeding grippers of the present invention and four sucking grippers are mounted to a general unidirectional cylinder, in combination. As shown in the drawing, bi-directional gripper devices 1 and typical sucking grippers 26 are mounted to the peripheral surface of a gripper mounting bracket 24, by means of robot hand attachments 25 and 25'. Six grippers are downwardly moved sequentially to carry out a finger widening operation or a sucking operation for gripping objects and then upwardly moved to their original positions. In case of placing the objects on desired places, the grippers are operated in a reversed manner. In case of using a robot of a scara type, it functions to adjust the rotation position and the insertion position of a robot hand. On the other hand, in case of using a robot of a cartesian type, there is no rotation of the robot hand.

As apparent from the above description, the present invention provides a bi-directional feeding gripper device which is capable of performing a bi-directional movement including upward and downward movements of the gripper and opening and closing movement of fingers, by means of a single cylinder, thereby enabling the overall construction to be simplified and the operation time to be reduced. As a result, the overall cycle time can be greatly reduced. Also, the bi-directional operation can be more accurately accomplished, thereby improving the reliance of works.

Where a plurality of gripper devices of the present invention are combined together to construct a multi-gripper system, so as to be used in a scara type robot or a cartesian type robot wherein the feeding and inserting of objects are carried out in vertical, various works can be simultaneously accomplished by the gripper devices. In this case, it is possible to reduce the weight of the overall system, as well as the overall cycle time. In addition, each gripper provides an advantage of being usable for a general purpose, since it is replaceable in a module manner.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A bi-directional feeding gripper device comprising:
    a cylinder;
    upper and lower cylindrical cap members mounted to upper and lower ends of the cylinder and provided with pressure passages communicated with the interior of the cylinder, respectively;
    an upper lifting piston disposed in the cylinder and having a driving rod mounted to the lower end thereof;
    a lower gripping piston disposed in the cylinder below the lifting piston to define a predetermined space from a lower end of the lifting piston, said gripping piston having a rod extending downwardly through the lower cap member such that a lower end of the rod protrudes beyond a lower end of the lower cap member, a rod receiving hole through which the driving rod of the lifting piston extends downwardly such that the lower end of the driving rod protrudes beyond the lower end of the rod of the gripping piston and a fluid flow passage through the gripping piston;
    a compression coil spring disposed around the driving rod in the predetermined space and adapted to urge the lifting piston and the gripping piston away from each other; and
    a gripper fixed to the lower end of the gripping piston and provided with a pair of fingers each having one end pivotally mounted to the gripper and the other end pivotally mounted to the protruding lower end of the driving rod, so that fingers move between an opening position and a gripping position, upon a vertical reciprocating movement of the lifting piston.

2. A bi-directional feeding gripper device in accordance with claim 1, wherein the gripping piston has a peripheral surface and the fluid flow passage comprises a plurality of vertical grooves in the peripheral surface adapted to communicate the predetermined space defined between the lifting piston and the gripping piston with the pressure passage formed at the lower cap member, and wherein the gripping piston has, at the upper portion of the rod receiving hole, an enlarged portion adapted to receive a larger diameter portion of the driving rod.

3. A bi-directional feeding gripper device in accordance with claim 1, wherein the lower cap member has a pair of vertical guide holes into which a pair of guide rods are upwardly inserted, respectively, each guide rod being fixedly mounted at its lower end to the gripper.

* * * * *